US006326323B1

(12) United States Patent
Shimano et al.

(10) Patent No.: US 6,326,323 B1
(45) Date of Patent: Dec. 4, 2001

(54) FABRIC FOR INK-JET RECORDING

(75) Inventors: Yasunao Shimano; Takeshi Minamiyama, both of Ishikawa (JP)

(73) Assignee: Komatsu Seiren Co., Ltd. (JP)

( * ) Notice: Subject to any disclaimer, the term of this patent is extended or adjusted under 35 U.S.C. 154(b) by 0 days.

(21) Appl. No.: 09/247,272

(22) Filed: Feb. 10, 1999

(30) Foreign Application Priority Data

Feb. 13, 1998 (JP) ................................................ 10-031579

(51) Int. Cl.[7] ............................. B32B 5/22; B32B 27/12; B32B 27/18

(52) U.S. Cl. ........................... 442/76; 442/118; 442/121; 442/136; 428/195; 428/323; 428/326

(58) Field of Search ............................. 442/76, 118, 121, 442/136; 428/323, 326, 195, 920, 921

(56) References Cited

U.S. PATENT DOCUMENTS

| | | | | |
|---|---|---|---|---|
| 5,683,784 | * | 11/1997 | Nakao et al. | 428/195 |
| 5,693,410 | * | 12/1997 | Malhotra et al. | 428/216 |
| 5,747,148 | * | 5/1998 | Warner et al. | 428/212 |
| 5,837,375 | * | 11/1998 | Brault et al. | 428/411.1 |

FOREIGN PATENT DOCUMENTS

| | | | | |
|---|---|---|---|---|
| 61-58788 | | 3/1986 | (JP) . | |
| 61-074880 | * | 4/1986 | (JP) . | |
| 62-231787 | * | 10/1987 | (JP) . | |
| 62-238783 | * | 10/1987 | (JP) . | |
| 02-300377 | * | 12/1990 | (JP) . | |
| 03-113081 | * | 5/1991 | (JP) . | |
| 03-140284 | * | 6/1991 | (JP) . | |
| 04-270679 | * | 9/1992 | (JP) . | |
| 7-125412 | | 5/1995 | (JP) . | |
| 08-311755 | * | 11/1996 | (JP) | B01J/20/24 |
| 07-276784 | * | 10/1995 | (JP) | B41M/5/00 |
| 2000-203148 | * | 7/2000 | (JP) | B41M/5/00 |
| 11-279914 | * | 10/1999 | (JP) | D04H/1/42 |
| 11-093062 | * | 4/1999 | (JP) | D06B/11/00 |

OTHER PUBLICATIONS

English translation of JP 03–113081, May 1991.*

* cited by examiner

*Primary Examiner*—Cheryl Juska
(74) *Attorney, Agent, or Firm*—Schnader Harrison Segal & Lewis LLP

(57) ABSTRACT

A fabric for ink-jet recording comprises a fibrous substrate and an ink absorbing layer formed thereon, wherein the ink absorbing layer contains fine fibrous cellulose with a diameter of 0.5 μm or less, a water-soluble nonionic polymer, porous silica, and a cationic polymer. The fabric also has a resin layer which includes a flame retardant formed on a side opposite to the ink absorbing layer. The ink absorbing layer has improved ink absorption and drying properties, while the color developing property, sharpness and moisture resistance of the images are improved.

3 Claims, No Drawings

FABRIC FOR INK-JET RECORDING

BACKGROUND OF THE INVENTION

1. Field of the Invention

The present invention relates to a fabric for ink-jet recording. In particular, the invention relates to a fabric for recording with ink-jet printers which record images by jetting liquid ink as droplets from a nozzle, and especially to a fabric for ink-jet recording which comprises a fibrous material as the substrate and has excellent ink absorption and drying properties during recording and excellent moisture resistance and color developing properties of the resulting recorded image.

The fabric for ink-jet recording of the invention can be applied for uses such as indoor and outdoor advertisement and tapestries for interior decoration.

2. Description of the Related Art

When recording on ink-jet recording sheets by spraying droplets of ink consisting of a dye or pigment dissolved or dispersed in a solvent, the droplets of ink are attached to the sheet by a printing head which scans in the lateral direction and advances in the vertical direction to print an image consisting of patterns or characters; however, when the absorption or drying properties of the ink are poor, the attached ink sometimes runs off, making it impossible to form a sharp image.

Also, when printing is overlaid with ink of a different color the total amount of ink is increased, thus causing problems of blotting and running and reducing the sharpness of the image. Thus, liquid ink must be rapidly absorbed in the ink absorbing layer of recording sheets, and must have low moisture on the surface for a dry appearance.

Prints obtained by ink jet printing have also been quite inferior to those obtained by screen printing, not only in terms of ink absorption and drying properties, but also as concerns the color developing property, i.e. the brightness, clarity and depth of the colors of the obtained image.

Furthermore, outdoor use demands moisture resistance to prevent blotting of the dye or pigment after printing even when in contact with rain or other water.

The prior art has dealt with these problems by combining the following technical elements.

First, fillers comprising porous silica or other inorganic compounds are used in the ink absorbing layer to increase the absorption and color developing property of water-based inks.

Second, water-soluble polymers such as polyvinyl alcohol and polyvinylpyrrolidone are used as binders for fixation onto supports without causing a loss in performance of the filler comprising the inorganic compound.

Third, the use of dye or pigment anchoring agents for a better color developing property has been proposed, examples of which include the use of a cationic polymer (Japanese Unexamined Patent Publication No. 61-58788), the use of a copolymer of a diallylamine acid salt and a monoallylamine acid salt (Japanese Examined Patent Publication No. 3-31594), the use of a monoallylamine salt polymer (Japanese Examined Patent Publication No. 6-30951), the use of an alumina sol (Japanese Unexamined Patent Publication No. 7-125412) and the combined use of dimethyldiallylammonium chloride and a divalent water-soluble metal salt (Japanese Examined Patent Publication No. 5-71393). Anionic dyes and pigments dispersed with anionic dispersing agents are anchored to the surface by ionic bonding with the aforementioned cationic substances, resulting in better color depth during printing and an improved moisture resistance.

Fourth, for uses involving substrate materials with no air permeability or absorption properties, such as synthetic paper, Japanese Unexamined Patent Publication No. 8-282091 discloses an ink-recording material with a 2-layer coat prepared by formation of an ink-anchoring layer containing non-water-soluble cellulose and a binder such as polyvinyl alcohol followed by formation of an ink receiving layer containing a cationic polymer and an inorganic pigment such as calcium carbonate, the object of which is to provide an ink material which is not blotted with the passage of time.

Recorded print images on ink-jet recording sheets obtained by this process, however, do not satisfy the demands for overall properties such as ink absorption and drying properties during ink-jet printing, the color developing property after printing and the moisture resistance of dye ink-printed images, and in particular ink-jet recording fabrics wherein the substrate of the ink-jet recording sheet is composed of a fibrous material such as a woven fabric have had poorer color development, absorption and drying properties compared to those which use paper.

In addition, since some ink-jet recording fabrics do not even provide sufficient color development or moisture resistance with simple printing, there is known a method whereby ink-jet recording fabrics which are printed under the conditions of high temperature and high humidity in color developing steps carried out for conventional screen printing after being printed in a ink-jet printer are treated to cause the dye to migrate into the fibers of the fibrous substrate themselves, for an increased color developing property and moisture resistance. This method, however, requires attachment of water-soluble substances, printing, color development through a color development step and a subsequent washing step to remove the water-soluble compounds attached to the fibrous substrate, and therefore the working steps are longer, creating a very inefficient and uneconomical situation; consequently, ink-jet recording fabrics have been desired which have fibrous substrates, have excellent color development, absorption and drying properties, and which can be used directly without undergoing a color development step after printing.

Moreover, recent years have seen the use of sheets a few meters to a few tens of meters in size which are printed with ink-jet printers, as hanging curtains for stores and event grounds and as curtains for construction sites, and therefore the additional property of flame resistance has been desired from the viewpoint of safety.

Conventional ink-jet recording sheets have also been associated with a problem in which the recorded images are shed upon folding or friction, and therefore improved durability of the recordings has also been desired.

SUMMARY OF THE INVENTION

It is an object of the present invention to overcome the aforementioned problems by providing an ink-jet recording fabric which has improved ink absorption properties (degree of absorption volume and blotting) and drying properties in the ink absorbing layer, and which can provide vastly improved color developing properties (brightness, clarity and depth of color) as well as sharpness and moisture resistance of the resulting images.

It is a further object of the invention to provide an ink-jet recording fabric which has improved durability of recorded images and is also flame retardant.

The invention therefore provides an ink-jet recording fabric characterized by comprising a fibrous substrate and an ink absorbing layer formed thereon, wherein the ink absorbing layer contains fine fibrous cellulose with a diameter of 0.5 μm or less, a water-soluble nonionic polymer, porous silica and a cationic polymer.

DESCRIPTION OF THE PREFERRED EMBODIMENTS

The fibrous substrate used according to the invention is not particularly restricted and may be made of synthetic fibers such as polyester, regenerated fibers such as rayon or natural fibers such as cotton, or a composite product thereof. From the standpoint of ink absorption and drying properties, a fibrous substrate comprising hydrophilic fibers such as cotton may be preferred. The fibrous substrate may be in the form of a woven or non-woven fabric.

The fibrous substrate may, if necessary, be subjected to fluorescent whitening for increased brightness and clarity of the image.

According to the invention, fine fibrous cellulose with a diameter of 0.5 μm or less is used in the ink absorbing layer to improve the absorption and drying properties of liquid inks, particularly aqueous inks. Such types of cellulose, which are known, include fine fibrous cellulose obtained by subjecting acetic acid bacteria-produced bacterial cellulose or fibrous cellulose to special mechanical treatment and fibrillation (for example, Cellish (trademark) by Dicell Chemicals). The fine fibrous cellulose is believed to have an effect of improving the water absorption due to the high hydrophilicity of the cellulose fibers and improving the water absorption and drying property due to the greater surface area provided by the fine fibrous structure.

The amount of the fine fibrous cellulose used will depend on the method of attachment, but it is generally preferred to be in the range of 0.1–5% by solid weight in the blended resin composition liquid used to prepare the ink absorbing layer.

According to the invention, porous silica is also used for the purpose of improving the clarity and increasing the water absorption, and it preferably has a particle size of 20 μm or less and a surface area of 150 $m^2/g$ or greater. Using a greater amount of porous silica will increase the brightness, clarity and color depth of the resulting image, but in most cases it is sufficient in an amount of about 1–3 times the weight of the water-soluble ionic polymer used as the binder component mentioned below. From the viewpoint of durability, the porous silica is preferably not used in too large a proportion since the coating strength will be reduced and this tends to promote shedding from the fiber surface. The content of porous silica in the blended composition liquid for the ink absorbing layer is preferably about 2–20 wt %.

A water-soluble nonionic polymer can also be used as a binder component. Specifically it is preferred to use polyvinyl alcohol or a silanol group-modified polyvinyl alcohol, or polyvinylpyrrolidone, since these have high hydrophilicity and thus seldom lower the water absorption of the fine fibrous cellulose or porous silica. These water-soluble nonionic polymers also have the advantage of high coating strength even with large amounts of the porous silica filler.

The amount of the water-soluble nonionic polymer in the blended resin composition liquid used to form the ink absorbing layer is preferably 1–10 wt %.

According to the invention, a cationic polymer can also be used to vastly improve the color depth of the dye or pigment and also as an anchoring agent for the ink. Preferred representative cationic polymers are diallyldimethylammonium chloride polymers.

These cationic polymers are thought to perform the role of forming a lake with the anion portion of the dye ink or pigment ink to anchor it.

Even though the cationic polymer provides a binding effect with the porous silica even when the cationic polymer is used alone without a water-soluble nonionic polymer, contact with water after formation of the image with dye ink results in the problem of blotting of the dye. Thus, the combined use of a polyvinyl alcohol or other water-soluble nonionic polymer binder with the cationic polymer can prevent blotting of dyes.

The cationic polymer is preferably used in the range of 1–10% by solid weight in the blended resin composition liquid used to obtain the ink absorbing layer.

The fabric for ink-jet recording of the invention has an ink absorbing layer which basically comprises the 4 types of components described above, but if necessary other components may be included, such as a titanium oxide pigment for increased whiteness or a fluorescent dye or fluorescent pigment for fluorescent whiteness of the ink absorbing layer. An ultraviolet absorbing agent may also be added for improved light color fastness of the ink.

The fabric for ink-jet recording of the invention may also contain a crosslinking agent in order to prevent shedding of the coating by actions such as folding or scratching of the ink absorbing layer which has been a disadvantage of ink-jet recording sheets containing silica, in order to prevent damage to the image by partial shedding or blotting caused by wetting by water indoors or wetting by rain outdoors which has been a disadvantage of water-soluble compounds such as polyvinyl alcohol and cationic polymers, and in order to increase the strength and moisture resistance of the ink absorbing layer.

The crosslinking agent used for this purpose may be any of various types including those which are insolubly dispersed in water and those which are soluble in water, but water-soluble ones are especially preferred. Crosslinking agents which are insolubly dispersed in water are themselves more hydrophobic than water-soluble crosslinking agents, and therefore lower the absorption and color developing properties of water-based inks.

As concrete examples of water-soluble crosslinking agents which can be used in the ink-jet recording fabric of the invention there may be mentioned aziridine-based crosslinking agents, polyisocyanate-based crosslinking agents and epoxy-based crosslinking agents. Two or more of these crosslinking agents may also be used in combination.

These crosslinking agents are preferably used in the range of 0.1–20 wt % with respect to the weight of the water-soluble nonionic polymer. While the crosslinking agent can be used in a greater amount, the ink absorbing layer may become too hard if the amount is too great.

The fabric for ink-jet recording of the invention may further contain a polyvalent metal salt in the ink absorbing layer. The inclusion of the polyvalent metal salt in the ink absorbing layer may result in an advantage of causing a phenomenon that the dye ink or pigment ink applied onto the fabric for ink-jet recording agglomerates on the surface of the fabric to improve the color depth. Further, the blotting of the ink may be inhibited when the image-recorded surface of the fabric is contacted with water.

Concrete examples of the polyvalent metal salt may include aluminum sulfate, aluminum chloride, magnesium sulfate, magnesium chloride, barium chloride, calcium chloride, zinc chloride and the like, with the aluminum salts being particularly preferred. The content of the polyvalent metal salt in the blended composition liquid to be used for forming the ink absorbing layer may preferably be 0.5 to 10 wt %.

Also, since flame resistance is often demanded for indoor advertisement displays, it is preferred for the ink-jet recording fabric of the invention to be flame resistant. In particular, by providing a resin layer including a flame-retardant on the side opposite to the image recording side it is possible to impart excellent flame resistance, without reducing the water absorption, drying or color developing properties. While combining a flame retardant with the ink absorbing layer is possible, it is not preferred because the water absorption, drying and color development properties of the ink absorbing layer, as well as the quality of the resulting recorded image, may be reduced.

Useful examples of flame retardants include phosphoric acid ester-based compounds comprising water-soluble phosphorus/bromine/nitrogen, mixtures of decabromodiphenyl oxide and antimony trioxide, hexabromocyclododecane and high molecular weight halogenated phosphoric acid esters. The binder resins used to anchor these may be urethane resins, acrylic resins, polyester resins, etc.

A flame-proofed material may also be used as the fibrous substrate.

The ink-jet recording fabric of the invention is obtained by providing a fibrous substrate with an ink absorbing layer and, specifically, the blended resin composition liquid used to obtain the ink absorbing layer may be an aqueous solution prepared with a solid portion in the range of 5–20% and a viscosity in the range of about 5000–100,000, with the blended resin solution coated onto the fibrous substrate. As coating means there may be mentioned knife coaters, gravure coaters, air knives, die coaters and the like.

The ink-jet recording fabric of the invention can provide sharp, clear image recordings because of its excellent color development, water absorption and drying properties without a color development step, even though it uses a substrate made of a fibrous material, and the resulting recorded sheets can be used for indoor or outdoor advertisements and curtains, and even for clothing. The ink used for recording exhibits superior recording performance whether it is pigment ink or dye ink, water-based ink or solvent-based ink.

In addition, since the resulting recorded sheets have excellent resistance to folding and abrasion and excellent moisture resistance, they can be used for long periods at any location and for any use.

The present invention will now be further explained by way of examples.

The performance of the ink-jet recording fabrics and resulting recorded sheets was evaluated in the following manner.

1. Pigment Ink Prints

A Super Sha-ing system ink-jet printer marketed by Komatsu Seiren, KK. was used to print 2-cm wide longitudinal stripes with a length of 5 cm using black, blue, red and yellow pigment ink at 360 dots per square inch.

2. Dye Ink Prints

An MJ5000C printer by Seiko-Epson, KK. was used to print 2-cm wide longitudinal stripes with a length of 5 cm using black, blue, red and yellow dye ink at 720 dots per square inch.

The printing performance was categorized according to the following evaluation scale.

A. Absorption/drying property

○: ink absorbed immediately upon printing of ink, no wetness remained on surface Δ: slight wetness remained on surface x: poor absorption, wetness remained on almost entire surface B. Blotting ○: each color phase brightly and clearly printed, absolutely no blotting at any color boundary areas Δ: slight blotting at color boundary areas x: considerable blotting at color boundary areas, blending of colors C. Color depth A comparison was made between prints on Yupo J5000 synthetic paper by Nisshinbo, KK. with pigment ink and prints on Super Fine special use paper by Seiko-Epson, KK. with dye ink, and the apparent depth and brightness and clarity were evaluated.

○: high color depth with brightness and clearness, similar to prints on the above paper Δ: low depth, poor brightness and clarity x: very low depth, absolutely no brightness and clarity D. Moisture resistance Prints with only dye ink were evaluated. A syringe was used to drop 3 drops of water at borders between printed and non-printed areas, and the degree of runoff of the dye with the water was judged.

○: absolutely no runoff

Δ: slight runoff x: considerable runoff, greatly reducing print density

EXAMPLE 1

After scouring a polyester flat woven fabric (150 g/cm$^2$ weight), it was impregnated with a 3% solution of UVITEX EBF (fluorescent whitening agent, product of Ciba Specialty Chemicals), squeezed with a mangle roll with an 80% pickup and dried at 120° C., and then heat treated for one minute using a tenter at 190° C. for color development.

Next, a blended resin composition liquid was prepared with the solid composition listed below to form an ink absorbing layer. The viscosity of the blended resin composition liquid was 45,000 centipoise.

Of the following components, PAS-H-10L is a 28% aqueous solution and the bacterial cellulose is a 10% aqueous slurry product, and their listed solid proportions were calculated based on their pure solid portions.

| | Solid proportion |
|---|---|
| PVA-117 (polyvinyl alcohol, Kuraray Co.) | 5% |
| PAS-H-10L (diallyldimethylammonium chloride polymer, Nitto Chemical Co.) | 3% |
| Silicia 470 | 13% |

This blended resin composition liquid was coated onto the above polyester woven fabric with a knife coater to an amount of 90 g/m$^2$, and drying at 130° C. produced a fabric for ink-jet recording.

An ink-jet printer was used to print an image with pigment ink on the ink-jet recording fabric; the performance including ink absorption and drying property during printing, and color blotting and color depth of the recording sheet were evaluated, and the results are listed in Table 1.

Comparative Example 1

The procedure of Example 1 was repeated except that the composition of the blended resin composition liquid used to form the ink absorbing layer was changed to the following with the bacterial cellulose eliminated.

The results are listed in Table 1.

| | Solid proportion |
|---|---|
| PVA-117 | 5% |
| PAS-H-10L | 3% |
| Silicia 470 | 13% |
| Water | 79% |

Comparative Example 2

The procedure of Example 1 was repeated except that the diallyldimethylammonium chloride polymer in the composition of the blended resin composition liquid used to form the ink absorbing layer was changed to an alumina sol.

The results are listed in Table 1.

| | Solid proportion |
|---|---|
| PVA-117 | 5% |
| Alumina Sol 520 (Nissan Chemical Co.) | 3% |
| Silicia 470 | 13% |
| Bacterial cellulose | 0.4% |
| Water | 78.6% |

TABLE 1

| | Absorption/drying property | Blotting | Color depth |
|---|---|---|---|
| Example 1 | ○ | ○ | ○ |
| Comp.Ex.1 | Δ–X | Δ | ○ |
| Comp.Ex.2 | ○ | ○ | Δ |

EXAMPLE 2

A bleached cotton oxford woven fabric (180 g/cm$^2$ weight) was used as a test fabric.

A blended resin composition liquid with the solid composition listed below was prepared to form an ink absorbing layer. The viscosity of the blended resin composition liquid was 50,000 centipoise.

Of the following components, PAS-H-10L is a 28% aqueous solution and Celish is a 10% aqueous slurry product, and their listed solid proportions were calculated based on their pure solid portions.

| | Solid proportion |
|---|---|
| PVA-117 | 5% |
| PAS-H-10L | 3% |
| Silicia 470 | 13% |
| Celish (fine fibrous cellulose, Dicell Chemicals) | 1% |
| Water | 88% |

The blend was coated onto the above cotton woven fabric with a knife coater to an amount of 100 g/m$^2$, and dried at 130° C. to produce a fabric for ink-jet recording.

An ink-jet printer was used to print an image with dye ink on the ink-jet recording fabric; the performance including ink absorption and drying property during printing, and color blotting and color depth of the recording sheet were evaluated, and the results are listed in Table 2.

Comparative Example 3

The procedure of Example 2 was repeated except that the composition of the blended resin composition liquid used to form the ink absorbing layer was changed to the following with the diallyldimethylammonium chloride polymer eliminated.

The results are listed in Table 2.

| | Solid proportion |
|---|---|
| PVA-117 | 5% |
| Silicia 470 | 3% |
| Celish | 1% |
| Water | 88% |

Comparative Example 4

The procedure of Example 2 was repeated except that the composition of the blended resin composition liquid used to form the ink absorbing layer was changed to the following with the porous silica eliminated.

The results are listed in Table 2.

| | Solid proportion |
|---|---|
| PVA-117 | 5% |
| PAS-H-10L | 3% |
| Celish | 1% |
| Water | 91% |

TABLE 2

| | Absorption/drying property | Blotting | Color depth |
|---|---|---|---|
| Example 2 | ○ | ○ | ○ |
| Comp.Ex.3 | Δ | Δ | Δ–○ |
| Comp.Ex.4 | ○ | ○ | Δ–○ |

EXAMPLE 3

A spun woven fabric (100 g/m$^2$ weight) consisting of 100% polyester which had been scoured by a common method was used as the fabric.

A blended resin composition liquid with the solid composition listed below was prepared to form an ink absorbing layer. The viscosity of the blended resin composition liquid was 41,000 centipoise.

Of the following components, PAS-H-10L is a 28% aqueous solution and Celish is a 10% aqueous slurry product, and their listed solid proportions were calculated based on their pure solid portions.

| | Solid proportion |
|---|---|
| PVA-117 | 5% |
| PAS-H-10L | 3% |
| Silicia 470 | 10% |
| Celish | 1% |
| Pentaerythritol-tris{β-(aziridyl)propionate} (water-soluble aziridine-based crosslinking agent) | 0.2% |
| Water | 80.8% |

The blend was coated onto the above polyester woven fabric with a knife coater to an amount of 100 g/m$^2$ and dried at 130° C. to produce a fabric for ink-jet recording.

An ink-jet printer was used to print an image with pigment ink on the ink-jet recording fabric.

The resulting image had good ink absorption, absolutely no blotting and good color depth. The printed product was exposed outdoors for 10 days (including rain on 5 of the days), but no problems of ink runoff or image alteration occurred.

EXAMPLE 4

A spun woven fabric (100 g/m$^2$ weight) consisting of 100% cotton which had been scoured and bleached by common methods was used as the fabric.

A blended resin composition liquid with the solid composition listed below was prepared to form an ink absorbing layer. The viscosity of the blended resin composition liquid was 39,000 centipoise.

| | Solid proportion |
|---|---|
| R-1130 (silanol-based modified polyvinyl alcohol, Kuraray Co.) | 5% |
| PAS-H-10L | 3% |
| Silicia 470 | 10% |
| Celish | 1% |
| Water | 81% |

The blend was coated onto the above cotton woven fabric with a knife coater to an amount of 100 g/m$^2$ and dried at 130° C. to produce a fabric for ink-jet recording.

An ink-jet printer was used to print an image with pigment ink on the ink-jet recording fabric.

The resulting image had good ink absorption, absolutely no blotting and good color depth.

EXAMPLE 5

A spun woven fabric (100 g/m$^2$ weight) consisting of 100% polyester which had been scoured by a common method was used as the fabric.

A blended resin composition liquid with the solid composition listed below was prepared to form an ink absorbing layer. The viscosity of the blended resin composition liquid was 45,000 centipoise.

| | Solid proportion |
|---|---|
| PVA-117 | 5% |
| PAS-H-10L | 3% |
| Silicia 530 (porous silica, 1.9 μm particle size, 500 m$^2$/g surface area, Fuji Silicia Co.) | 10% |
| Celish | 1% |
| Water | 81% |

The blend was coated onto the above polyester woven fabric with a knife coater to an amount of 100 g/m$^2$ and dried at 130° C.

For flame resistance, the following flame retardant-containing resin was prepared.

| | Mixing ratio (wt %) |
|---|---|
| Nonnen SM-16 (aqueous dispersion of decabromodiphenyl oxide and antimony trioxide, flame retardant of Marubishi Yuka Co.) | 70% |
| Inpranyl DLN (water-dispersed urethane resin, product of Bayer Co.) | 30% |

The blended resin was coated on the surface of the ink absorbing layer formed earlier and on its opposite side with a knife coater to an amount of 70 g/m$^2$, and drying at 130° C. produced a fabric for ink-jet recording.

An ink-jet printer was used to print an image with pigment ink on the ink-jet recording fabric.

The resulting image had good ink absorption, absolutely no blotting and good color depth.

The flame-proofness of the recording sheet was also evaluated by a flammability test method for fiber products by a 45° microburner method according to JISL-1091A-1, and since the flame extinguished within 3 seconds after ignition it qualified for flammability category 3.

EXAMPLE 6

A blended resin composition liquid with the solid composition listed below was prepared to form an ink absorbing layer. The viscosity of the blended resin composition liquid was 46,000 centipoise.

| | Solid proportion |
|---|---|
| PVA-117 | 5% |
| PAS-H-10L | 3% |
| Silicia 470 | 10% |
| Bacterial cellulose | 0.4% |
| Aluminum sulfate | 3% |
| Water | 75.6% |

The blend was coated onto a polyester flat woven fabric which is the same as used in Example 1 with a knife coater to an amount of 90 g/m$^2$ and dried at 130° C. to produce a fabric for ink-jet recording.

When an image was printed on the ink-jet recording fabric with pigment ink, an image-printed fabric having a color depth higher than that of the printed fabric obtained in Example 1.

When 3 drops of water was dropped onto the printed fabric 1, 3 and 6 hours after printing using a syringe, no blotting was observed to prove a good moisture resistance.

What is claimed is:

1. A fabric for ink-jet recording comprising a fibrous substrate and an ink absorbing layer formed on a side thereof, wherein said ink absorbing layer contains fine fibrous cellulose with a diameter of 0.5 $\mu$m or less a water-soluble nonionic polymer, porous silica and a cationic polymer, wherein a resin layer, which includes a flame retardant, is formed on a side opposite the ink absorbing layer.

2. A fabric for ink-jet recording according to claim 1, wherein the ink absorbing layer further contains a water-soluble crosslinking agent.

3. A fabric for ink-jet recording according to claim 1, wherein the ink absorbing layer further contains a polyvalent metal salt.

* * * * *

UNITED STATES PATENT AND TRADEMARK OFFICE

CERTIFICATE OF CORRECTION

PATENT NO. : 6,326,323 B1
DATED : December 4, 2001
INVENTOR(S) : Shimano et al.

It is certified that error appears in the above-identified patent and that said Letters Patent is hereby corrected as shown below:

<u>Column 6,</u>
Line 57, Table, after the line beginning "silicia 470", please insert the rest of the table as follows:
-- (porous silicia, 12 μm particle size, 300 m2/g surface area,
Fuji Silicia Co.)

| | |
|---|---|
| Bacterial cellulose (Ajinomoto Co.) | 0.4% |
| Water | 78.6% --. |

<u>Column 8,</u>
Table 2, line 2, under subheading "color depth," please change "○" to -- x --; and
Line 3, under heading "color depth," please change "○" to -- x --.

Signed and Sealed this

Thirtieth Day of July, 2002

*Attest:*

JAMES E. ROGAN

*Attesting Officer* *Director of the United States Patent and Trademark Office*